United States Patent
Abatzoglou et al.

(10) Patent No.: US 7,212,149 B2
(45) Date of Patent: May 1, 2007

(54) SYSTEM, METHOD AND COMPUTER PROGRAM PRODUCT FOR DETECTING AND TRACKING A MOVING GROUND TARGET HAVING A SINGLE PHASE CENTER ANTENNA

(75) Inventors: Theagenis J. Abatzoglou, Huntington Beach, CA (US); Irwin E. Alber, Irvine, CA (US); Harland F. Romberg, Newport Beach, CA (US)

(73) Assignee: The Boeing Company, Chicago, IL (US)

( * ) Notice: Subject to any disclaimer, the term of this patent is extended or adjusted under 35 U.S.C. 154(b) by 215 days.

(21) Appl. No.: 10/870,734

(22) Filed: Jun. 17, 2004

(65) Prior Publication Data

US 2005/0280571 A1    Dec. 22, 2005

(51) Int. Cl.
G01S 13/90 (2006.01)
G01S 13/00 (2006.01)

(52) U.S. Cl. ............... 342/25 F; 342/25 R; 342/25 A; 342/25 D; 342/104; 342/106; 342/107; 342/109; 342/113; 342/115; 342/118; 342/146; 342/147; 342/175; 342/195; 342/196

(58) Field of Classification Search .... 342/25 R–25 F, 342/104–115, 118, 128–147, 175, 189–197, 342/159–164, 176, 179
See application file for complete search history.

(56) References Cited

U.S. PATENT DOCUMENTS

| | | | | |
|---|---|---|---|---|
| 3,735,400 A | * | 5/1973 | Sletten et al. ............. | 342/25 B |
| 4,134,113 A | * | 1/1979 | Powell ...................... | 342/25 C |
| 4,551,724 A | * | 11/1985 | Goldstein et al. ......... | 342/25 C |
| 4,589,610 A | * | 5/1986 | Schmidt ................... | 342/25 R |
| 4,825,213 A | * | 4/1989 | Smrek ...................... | 342/25 B |
| 4,963,877 A | * | 10/1990 | Wood et al. .............. | 342/25 A |
| 4,975,704 A | * | 12/1990 | Gabriel et al. ............ | 342/25 C |
| 5,122,803 A | * | 6/1992 | Stann et al. .............. | 342/25 B |
| 5,327,140 A | * | 7/1994 | Buckreuss ................ | 342/25 A |
| 5,343,203 A | * | 8/1994 | Chen ........................ | 342/25 B |
| 5,424,742 A | * | 6/1995 | Long et al. ............... | 342/25 C |
| 5,430,445 A | * | 7/1995 | Peregrim et al. ......... | 342/25 C |
| 5,546,085 A | * | 8/1996 | Garnaat et al. ........... | 342/25 A |
| 5,945,937 A | * | 8/1999 | Fujimura .................. | 342/25 C |

(Continued)

OTHER PUBLICATIONS

Greg Welch, Gary Bishop; *SCAAT: Incremental Tracking with Incomplete Information*; 12 pages; University of North Carolina at Chapel Hill.

(Continued)

*Primary Examiner*—Bernarr E. Gregory
(74) *Attorney, Agent, or Firm*—Alston & Bird LLP

(57) ABSTRACT

A synthetic aperture radar (SAR) system having a single phase center antenna is provided, the SAR system including a measurement unit and a tracker unit. The measurement unit is capable of receiving a phase history of a target point scatterer. From the phase history, then, the measurement unit is capable of estimating a ground position, velocity and acceleration of the target to thereby detect the target. The tracker unit, in turn, is capable of updating the ground position, velocity and acceleration of the target to thereby track the target based upon the ground position, velocity and acceleration. In this regard, the tracker unit is capable of updating the ground position, velocity and acceleration using a Kalman filter.

28 Claims, 5 Drawing Sheets

U.S. PATENT DOCUMENTS

| | | | |
|---|---|---|---|
| 6,603,424 B1 | 8/2003 | Abatzoglou | |
| 6,670,907 B2* | 12/2003 | Cho | 342/25 R |
| 6,864,827 B1* | 3/2005 | Tise et al. | 342/25 A |
| 6,873,285 B2* | 3/2005 | Carrara et al. | 342/25 R |
| 6,943,724 B1* | 9/2005 | Brace et al. | 342/25 B |

OTHER PUBLICATIONS

Theagenis J. Abatzoglou, Gregory O. Green; *Range, Radial Velocity, and Acceleration MLE Using Radar LFM Pulse Train*; IEEE Transactions on Aerospace and Electronic Systems; Oct. 1998; pp. 1070-1084; vol. 34, No. 4.

R.P. Perry, R.C. DiPietro; R.L. Fante; *SAR Imaging of Moving Targets*; IEEE Transactions of Aerospace and Electronic Systems; Jan. 1999; pp. 188-200; vol. 35, No. 1.

Peter S. Maybeck; *Stochastic models, estimation, and control—vol. 1*; Chapater 1; Dec. 1999; 19 pages; Academic Press, Inc., New York, New York.

Pascal Sebah, Xavier Gourdon; *Newton's method and high order iterations*; Oct. 2001; 10 pages.

Greg Welch, Gary Bishop; *An Introduction to the Kalman Filter* (Siggraph 2001, Course 8); Aug. 2001; 36 pages; ACM, Inc.

* cited by examiner

SYSTEM, METHOD AND COMPUTER PROGRAM PRODUCT FOR DETECTING AND TRACKING A MOVING GROUND TARGET HAVING A SINGLE PHASE CENTER ANTENNA

FIELD OF THE INVENTION

The present invention relates generally to systems and methods of processing synthetic aperture radar signals and, more particularly, relates to systems and methods of detecting and tracking a moving target utilizing a synthetic aperture radar system.

BACKGROUND OF THE INVENTION

There has been a continuing effort to develop radar systems which are suitable for high-resolution applications, such as ground-mapping and air reconnaissance. Initially, this finer resolution was achieved by the application of pulse-compression techniques to conventional radar systems which were designed to achieve range resolution by the radiation of a short pulse, and angular, or azimuth, resolution by the radiation of a narrow beam. The pulse-compression techniques provided significant improvement in the range resolution of the conventional radar systems, but fine angular resolution by the radiation of a narrow beam still required a large-diameter antenna which was impractical to transport with any significant degree of mobility. Subsequent to the development of pulse-compression techniques, synthetic aperture radar (SAR) techniques were developed for improving the angular resolution of a radar system to a value significantly finer than that directly achievable with a radiated beam width from a conventional antenna of comparable diameter.

In prior techniques, an equivalent to a large-diameter antenna was established which was comprised of a physically long array of antennas, each having a relatively small diameter. In the case of a long antenna array, a number of radiating elements were positioned at sampling points along a straight line and transmission signals were simultaneously fed to each element of the array. The elements were interconnected such that simultaneously received signals were vectorially added to exploit the interference between the signals received by the various elements to provide an effective radiation pattern which was equivalent to the radiation pattern of a single element multiplied by an array factor. That is, the product of a single element radiation pattern and the array factor resulted in an effective antenna pattern having significantly sharper antenna pattern lobes than the antenna pattern of the single element.

SAR systems are based upon the synthesis of an effectively long antenna array by signal processing means rather than by the use of a physically long antenna array. With a SAR, it is possible to generate a synthetic antenna many times longer than any physically large antenna that could be conveniently transported. As a result, for an antenna of given physical dimensions, the SAR will have an effective antenna beam width that is many times narrower than the beam width which is attainable with a conventional radar. In most SAR applications, a single radiating element is translated along a trajectory, to take up sequential sampling positions. At each of these sampling points, a signal is transmitted and the amplitude and the phase of the radar signals received in response to that transmission are stored. After the radiating element has traversed a distance substantially equivalent to the length of the synthetic array, the signals in storage are somewhat similar to the signals that would have been received by the elements of an actual linear array antenna.

A SAR can obtain a resolution similar to a conventional linear array of equivalent length as a consequence of the coherent transmission from the sampling points of the SAR. The stored SAR signals are subjected to an operation which corresponds to that used in forming the effective antenna pattern of a physical linear array. That is, the signals are added vectorially, so that the resulting output of the SAR is substantially the same as could be achieved with the use of a physically long, linear antenna array.

In generating the synthetic antenna, the signal processing equipment of a SAR operates on a basic assumption that the radar platform travels along a straight line trajectory at a constant speed. In practice, an aircraft carrying the radar antenna is subject to deviations from such non-accelerated flight. It is therefore necessary to provide compensation for these perturbations to straight-line motion. This motion compensation must be capable of detecting the deviation of the radar platform path from a true linear path.

Briefly, and referring now to FIG. 1 in the drawings, a SAR system carried by an aircraft 10 maps a target region 12 by transmitting and receiving radar signals at various sampling points $S_1, \ldots, S_N$, along the flight path 14 of the aircraft. In this regard, the SAR system may be positioned in the nose portion 15 of the aircraft. As the SAR system operates, detection, imaging and identification of moving ground targets can be a critical piece of intelligence. Typically, such detection, imaging and identification is performed with a spatial diversity radar having a multiple phase center antenna, such as a displaced phase center antenna (DPCA) or space-time adaptive processing (STAP) system.

As will be appreciated, the primary goals of such conventional SAR systems are typically to locate a target on the ground, track its motion and form a corresponding SAR image of the target. Unfortunately, location, tracking and imaging can be difficult to accomplish with a single phase center SAR antenna. Several surveillance and tracking radars have been developed for moving target detection and tracking, such as the JSTARS (Joint Surveillance and Target Attack Radar System), which can also form an inverse SAR image of a moving target. Whereas such radar systems have a multiple phase center antenna that allows the signal processor to detect and track a moving target on the ground, these systems are expensive to build. Also, such systems typically require accurate maintenance of the phase calibration among the phase centers.

SUMMARY OF THE INVENTION

In light of the foregoing background, the present invention provides an improved system, method and computer program product for detecting and tracking a moving target in a synthetic aperture radar (SAR) system including a single phase center antenna. The system, method and computer program product of embodiments of the present invention use successive processing of subdwells of a long SAR dwell to produce estimates of the moving target ground position, velocity and acceleration. In turn, these motion parameters can be used to track the target. Thus, embodiments of the present invention are capable of detecting and tracking a moving target without requiring a monopulse of a multiple phase center antenna.

According to one aspect of the present invention, a synthetic aperture radar (SAR) system having a single phase center antenna is provided. The system includes a measurement unit and a tracker unit. The measurement unit is capable of receiving a phase history of a target point scatterer. More particularly, the measurement unit can be capable of receiving a total radar return including the phase history and ground clutter. Based upon the phase history, then, the measurement unit is capable of estimating a ground position, velocity and acceleration of the target to thereby detect the target. The tracker unit, in turn, is capable of updating the ground position, velocity and acceleration of the target to thereby track the target based upon the estimated ground position, velocity and acceleration. In this regard, the tracker unit is capable of updating the ground position, velocity and acceleration using a Kalman filter.

More particularly, the measurement unit can be capable of estimating the ground position, velocity and acceleration in accordance with a least squares estimation technique. In instances where the ground clutter is uniform, the measurement unit can be capable of estimating the ground position, velocity and acceleration in accordance with a maximum likelihood estimation (MLE) technique. In this regard, the measurement unit can be capable estimating the ground position, velocity and acceleration by performing a coarse search, and thereafter performing a fine search. For example, the measurement unit can be capable of performing the coarse search in accordance with a Keystone technique, and performing the fine search in accordance with Newton's method for finding the zero of a function of a plurality of variables.

The SAR system can further include a moving target imaging unit. In such instances, the moving target imaging unit is capable of obtaining data representative of a SAR image of the moving target based upon the updated the ground position, velocity and acceleration of the target. More particularly, the moving target imaging unit can be capable of motion compensating to the phase history of the target point scatterer, and polar formatting the motion compensated phase history. Thereafter, the moving target imaging unit can be capable of two-dimensional Fourier transforming the polar-formatted motion compensated phase history to thereby obtain the data representative of the SAR image.

BRIEF DESCRIPTION OF THE DRAWINGS

Figure 1:
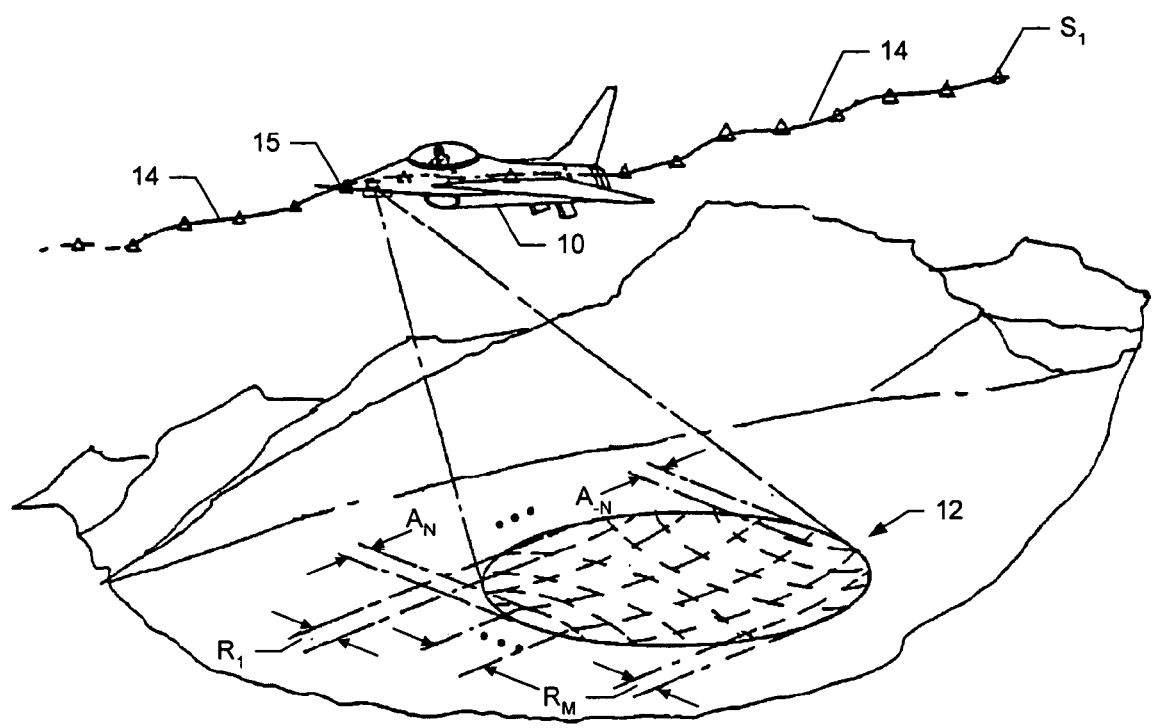
Figure 2:
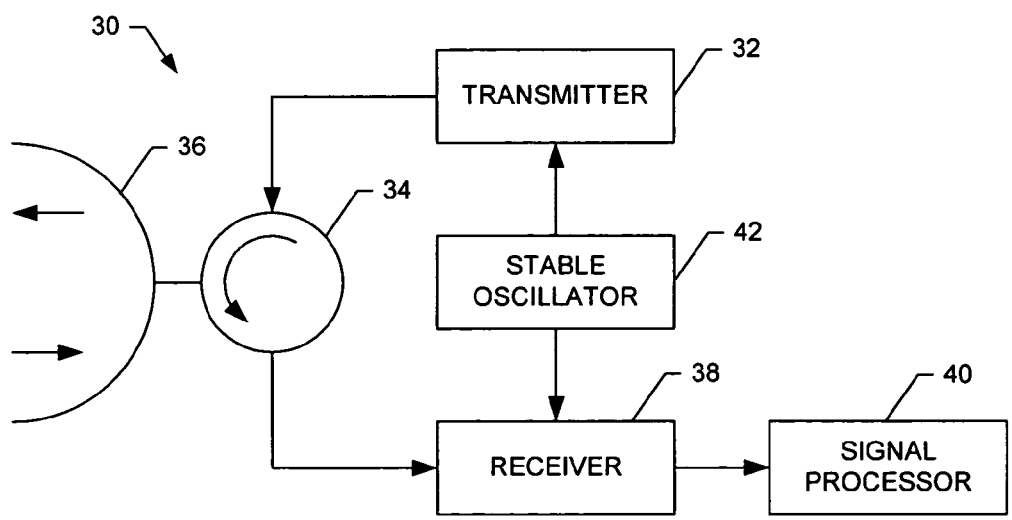
Figure 3:
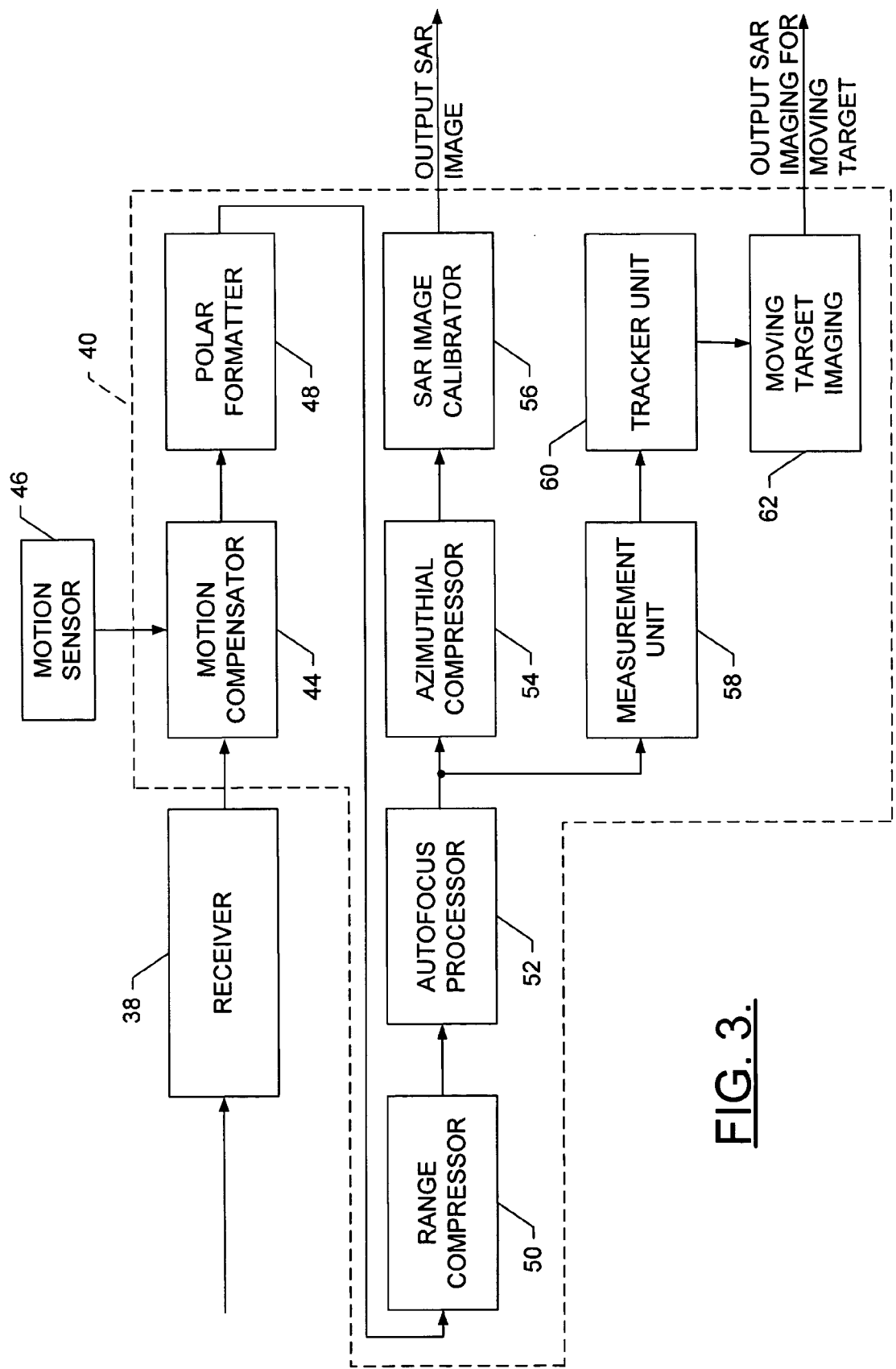
Figure 4:
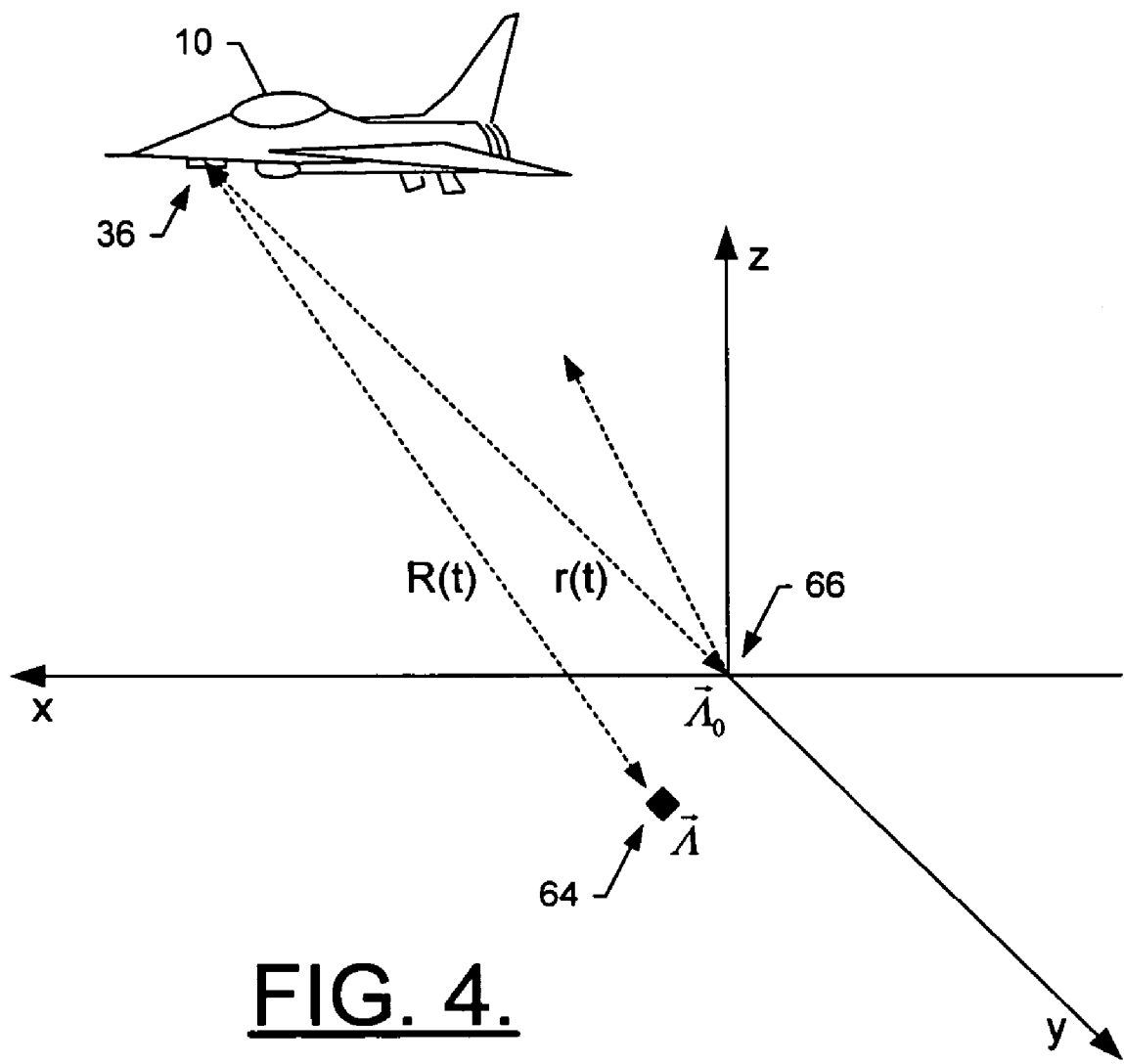
Figure 5:
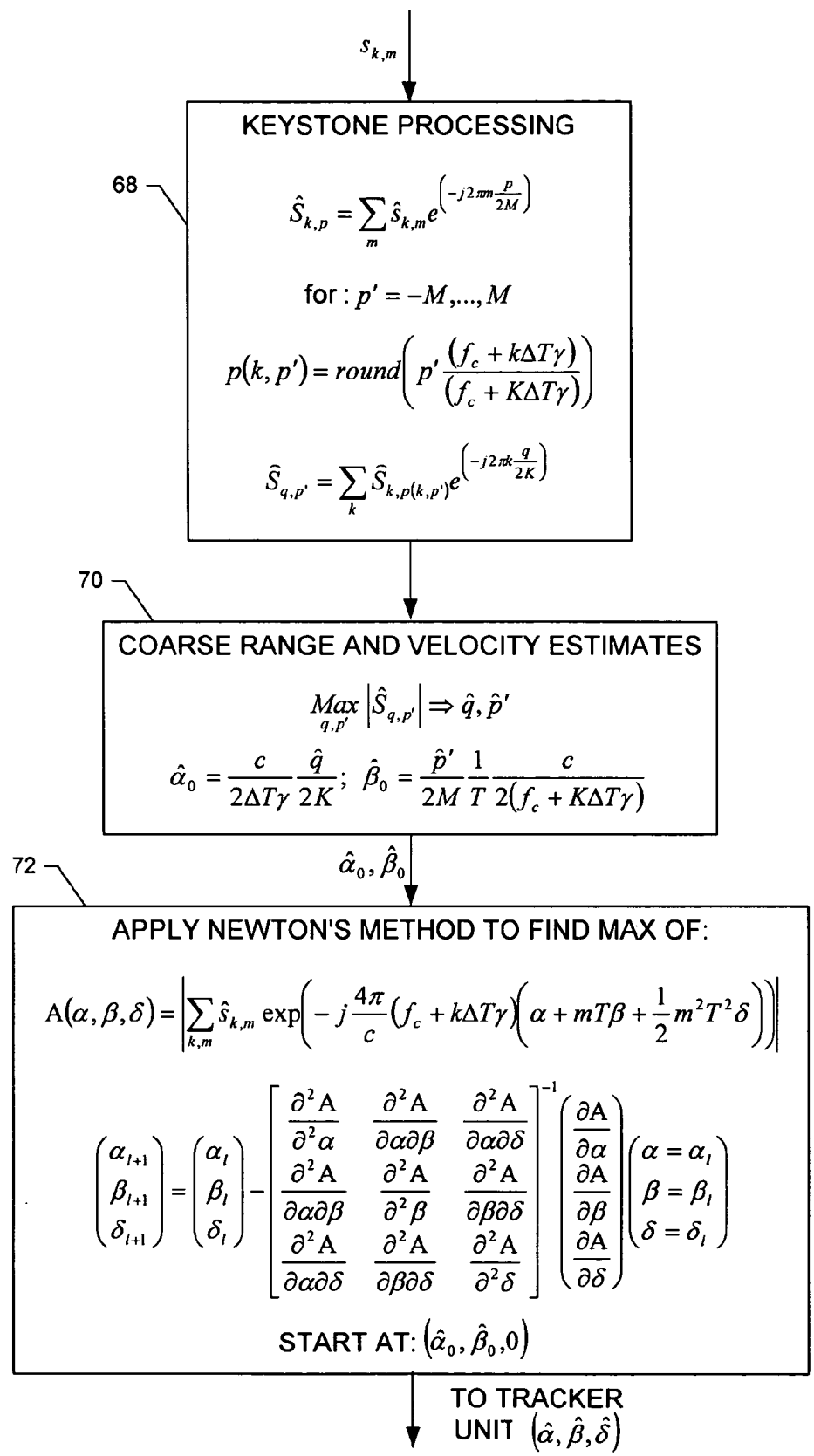
Figure 6:
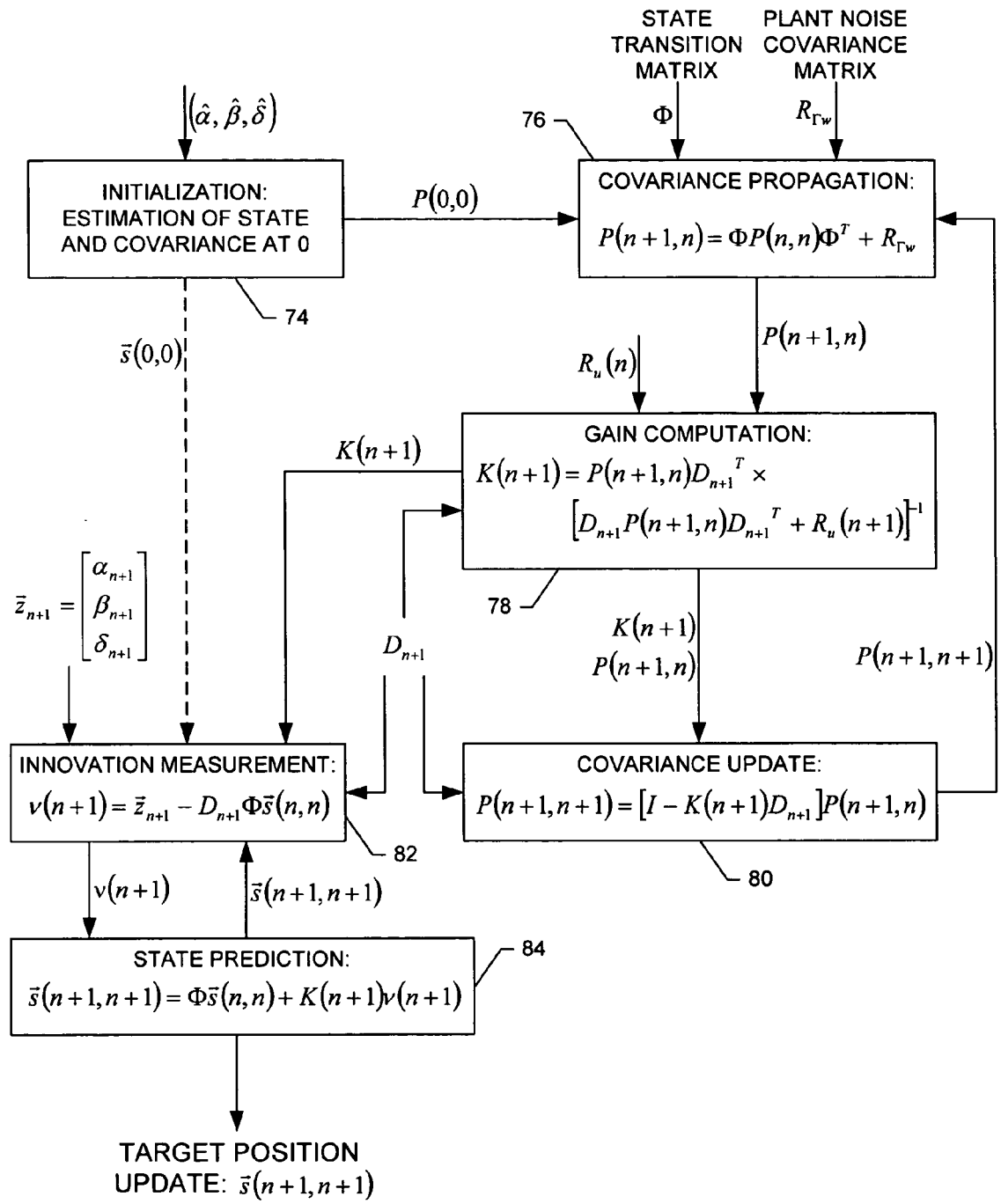

Having thus described the invention in general terms, reference will now be made to the accompanying drawings, which are not necessarily drawn to scale, and wherein:

FIG. 1 is a pictorial view of an aircraft following a defined flight path and mapping terrain with a synthetic aperture radar (SAR) system according to one embodiment of the present invention;

FIG. 2 is a schematic block diagram of a SAR system according to one embodiment of the present invention;

FIG. 3 is a schematic block diagram highlighting the signal processor of the SAR system according to one embodiment of the present invention;

FIG. 4 is a pictorial view of the aircraft of FIG. 1 detecting and tracking a moving target according to one embodiment of the present invention;

FIG. 5 is a flow chart illustrating various steps in a method of estimating the range and linear range migration of a moving target, as such may be performed by a measurement unit in accordance with one embodiment of the present invention; and FIG. 6 is a flow chart illustrating various steps in updating data representative of the position and motion of a moving target, as such may be performed by a tracker unit in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 2, a synthetic aperture radar (SAR) system therein is indicated generally by reference numeral 30. To briefly describe a conventional SAR system, a radar signal having a certain frequency is generated by a transmitter 32. The generated signal is sent to a duplexer 34 where it is further transmitted to an antenna 36, which advantageously can comprise a single phase center antenna. The signal is then transmitted from the antenna to a particular target region such as an area of terrain 12 (see FIG. 1). A portion of the signal is reflected off the terrain back to the antenna. The received signal is transmitted back to the duplexer, which forwards the received signal to a receiver 38, which preprocesses the received signal and thereafter passes the signal to a signal processor 40.

The SAR 30 may include a stable oscillator 42 that is provided for correlating the phase relationship between the signal that is generated by the transmitter 32 and the reflected signal that is preprocessed by the receiver 38. The reflected signal received by the receiver is an analog signal. After preprocessing by the receiver, the signal processor integrates the reflected signal with other received signals over time into range lines $R_1, \ldots, R_M$ 16 (shown in FIG. 1), where each range line includes a plurality of azimuth positions $A_{-N}, \ldots, A_N$. The range lines can, in turn, be used to generate an image of the target region 12.

During preprocessing, the receiver 38 mixes the reflected signals with a reference signal from the stable oscillator 42, as described below. This results in signals, each consisting of a sequence of digital pulses, where each pulse is represented by a complex number within the pulse. As known to those skilled in the art, the receiver then low pass filters the signals and slows the data rate. Thereafter, the digital signals are passed to the signal processor 40.

Operating in spotlight mode, the antenna 36 typically stays pointed to a fixed area on the ground whose center point is used as the scene center. Thus, referring now to FIG. 3, within the signal processor, a motion compensator 44 adjusts the phase of the digital signals so the scene center is at DC. In other words, the motion compensator subtracts the phase contribution from the scene center from each of the digital signals. In this regard, the motion compensator receives motion information from a motion sensor 46. The motion sensor can include any of a number of known devices but, according to one embodiment, the motion sensor includes an inertial navigation system (INS) that senses position information concerning the aircraft 10 that can be used to calculate the position of the antenna. Typically, the motion sensor further includes a reference function processor that generates an antenna position signal from the position information from the INS. The antenna position signal is then transmitted to the motion compensator.

After the motion compensator 44 has adjusted the phase of the digital signals, a polar formatter 48 reformats the digital signals. In this regard, the polar formatter takes the digital signals which represent points on a polar grid and interpolates the digital signals to a Cartesian grid. The reformatted digital signals are then passed to a range compressor 50, which compresses the radar energy of the digital signals in the range dimension. As is known to those skilled in the art, the range compressor compresses the radar energy via a Fourier transform along the range lines or fast time samples (i.e. samples with respect to the frequency band of the radar). Now along ranges where significant target returns exist, the digital signals have strong signal components sampled in slow time.

The digital signals at the output of the range compressor 50 carry information about target scatterers in the azimuth positions and phase errors that need to be removed before a clear SAR image of the scene can be obtained. Thus, the digital signals proceed from the range compressor to an autofocus processor 52, which corrects for phase errors present in the returns along slow time. After the autofocus processor 52 has corrected for the phase errors, the digital signals pass to an azimuthial compressor 54, which is performs a Fourier transform along slow time, as such will be appreciated by those skilled in the art. Finally, the digital signals proceed to an image calibrator 56, which calibrates the image for antenna patterns and other known distortions on the image, as also known to those skilled in the art.

Also, as the digital signals pass to the azimuthial compressor 54, the digital signals from the autofocus processor 52 pass to a measurement unit 58. As explained below, the measurement unit is capable of estimating the range, radial velocity and acceleration of a moving target. Following the measurement unit, data representative of the motion of the target or more particularly a three-dimensional vector of range, radial velocity and acceleration of the target, can be passed to a tracker unit 60. The tracker unit, in turn, is capable of providing updated data representative of the position and motion of the moving target, including the position, velocity and acceleration in the x and y coordinates on the ground. The updated target motion parameters can then be provided to a moving target imaging unit 62. The moving target imaging unit, in turn, can be capable of obtaining data representative of a SAR image of the moving target as if the moving target were stationary. In this regard, the moving target imaging unit can apply motion compensation to the phase history with respect to the moving target, followed by polar formatting and two-dimensional Fourier transformation. The SAR image of the target, then, can illustrate the target around the origin of a coordinate system including the target. If so desired, the data can be low pass filtered after motion compensation is applied, and thereafter decimated, to save significant amount of computational load.

Operation of the measurement and tracker units 58, 60 will now be described in accordance with embodiments of the present invention. Referring briefly to FIG. 4, the antenna 36 of a SAR system 30 carried by an aircraft 10 is shown illuminating a moving target 64. As shown, $\vec{\Theta}_n(t)$ represents the trajectory of the SAR antenna phase center in Cartesian coordinates, x, y and z. Also, R(t) represents the distance from the phase center of the antenna to the target, and r(t) represents the distance from the phase center of the antenna to the origin 66 of the coordinate system within which the target is located, where both distances are functions of time, t.

A three-dimensional (3D) vector from the antenna 36 phase center of the SAR system 30 to the target 64 can be represented by $\vec{\Lambda}$, while $\vec{\Lambda}_0$ represents the 3D vector from the antenna phase center to the origin 66 of the coordinate system. As will be appreciated, then, the distance between the origin of the coordinate system and the moving target can be determined in accordance with the following:

$$\Delta \Lambda = \vec{\Lambda} - \vec{\Lambda}_0 = (x_0, y_0) + t(x_0', y_0') + \frac{1}{2}t^2(x_0'', y_0'') \quad (1)$$

where $(x_0, y_0)$, $(x_0', y_0')$ and $(x_0'', y_0'')$ represent the position, velocity and acceleration, respectively, of the moving target at the center of the dwell, presuming the target moves along the ground having negligible movement in the z direction.

Without loss of generality, the digital signals, representing the phase of the received radar signals from a target point scatterer can be represented as follows:

$$\exp\left(j\frac{4\pi}{c}(f + f_c)(R(t) - r(t))\right) \quad (2)$$

In equation (2), c represents the speed of light, $f_c$ represents the center frequency of the transmitted signals, and f represents the frequency variable within the passband of the transmitted signals. Now, consider the following quadratic expansion of the distance difference: $R(t)-r(t)$ about the center time of each dwell:

$$R(t) - r(t) \approx \alpha + \beta t + \frac{1}{2}\delta t^2 \quad (3)$$

where $\alpha$ represents the range of the target, $\beta$ represents the radial velocity of the target, and $\delta$ represents the radial acceleration of the target. Further expanding the position, velocity and acceleration of the target, it can be shown that:

$$\alpha = \vec{a} \cdot \Delta \Lambda \quad (4)$$

$$\beta = -[-\vec{b} + (\vec{a} \cdot \vec{b})\vec{a}] \cdot \Delta \Lambda \quad (5)$$

$$\delta = -2\left[\left[\vec{a} \cdot \vec{d} + \frac{1}{2}\|\vec{b}\|^2 - \frac{3}{2}(\vec{a} \cdot \vec{b})^2\right]\vec{a} + (\vec{a} \cdot \vec{b})\vec{b} - \vec{d}\right] \cdot \Delta \Lambda \quad (6)$$

and $$\vec{a} = \frac{\vec{\Theta}(t_n) - \vec{\Lambda}_0}{\|\vec{\Theta}(t_n) - \vec{\Lambda}_0\|} \quad (7)$$

$$\vec{b} = \frac{\vec{v}(t_n)}{\|\vec{\theta}(t_n) - \vec{\Lambda}_0\|} \quad (8)$$

$$\vec{d} = -\frac{1}{2}\frac{|\vec{v}(t_n)|^2}{\|\vec{\Theta}(t_n) - \vec{\Lambda}_0\|^2}\frac{\vec{\Theta}(t_n)}{\|\vec{\Theta}(t_n) - \vec{\Lambda}_0\|} \quad (9)$$

In the preceding equations (7), (8) and (9), $t_n$ represents the middle of time of the nth radar dwell, and $\vec{v}(t_n)$ represents the velocity vector of the radar platform (e.g., aircraft 10) at time $t_n$.

To simplify notation, vectors $\vec{A}$, $\vec{B}$ and $\vec{C}$ can be defined as follows:

$$\vec{A} = \vec{a} \quad (10)$$

$$\vec{B} = -\left[-\vec{b} + (\vec{a}\cdot\vec{b})\vec{a}\right] \quad (11)$$

$$\vec{C} = -2\left[\left[\vec{a}\cdot\vec{d} + \frac{1}{2}\|\vec{b}\|^2 - \frac{3}{2}(\vec{a},\vec{b})^2\right]\vec{a} + (\vec{a}\cdot\vec{b})\vec{b} - \vec{d}\right] \quad (12)$$

From equations (10), (11) and (12), it can be shown that vectors $\vec{A}$, $\vec{B}$ and $\vec{C}$ depend exclusively on the geometry and motion of the radar platform and the scene center, and not on the moving target 64. This is because $\vec{a}$, $\vec{b}$ and $\vec{c}$ do not contain information about the moving target.

Thereafter, equation (3) can be rewritten as follows:

$$R(t) - r(t) \approx \alpha + \beta t + \frac{1}{2}\delta t^2 = \quad (13)$$

$$A_x x_0 + A_x x_0' t + \frac{1}{2} A_x x_0'' t^2 + A_y y_0 +$$

$$A_y y_0' t + \frac{1}{2} A_y y_0'' t^2 + B_x x_0 t + B_x x_0' t^2 +$$

$$B_y y_0 t + B_y y_0' t^2 + \frac{1}{2} C_x x_0 t^2 + \frac{1}{2} C_y y_0 t^2 =$$

$$(A_x x_0 + A_y y_0) + (A_x x_0' + A_y y_0' + B_x x_0 + B_y y_0)t +$$

$$\left(\frac{1}{2}A_x x_0'' + \frac{1}{2}A_y y_0'' + B_x x_0' + B_y y_0' + \frac{1}{2}C_x x_0 + \frac{1}{2}C_y y_0\right)t^2$$

And from the above, $\alpha$, $\beta$ and $\delta$ can be expressed as in the following equations (14), (15) and (16), respectively:

$$\alpha = (A_x x_0 + A_y y_0) \quad (14)$$

$$\beta = (A_x x_0' + A_y y_0' + B_x x_0 + B_y y_0) \quad (15)$$

$$\delta = (A_x x_0'' + A_y y_0'' + 2B_x x_0' + 2B_y y_0' + C_x x_0 C_y y_0) \quad (16)$$

The second order motion coefficients $\alpha$, $\beta$ and $\delta$ describe the coupling between the target motion coordinates and the radar-scene center geometry. More particularly, the second order coefficients represent the range, radial velocity and acceleration of the target, respectively. By estimating $\alpha$, $\beta$, and $\delta$, then, the system can determine the motion of the target 64.

Assume that the phase history from a target point scatterer has the following discrete form:

$$s_{k,m} = ze\left(j\frac{4\pi}{c}(f_c + k\Delta T\gamma)\left(\alpha_n + mT\beta_n + \frac{1}{2}m^2T^2\delta_n\right)\right) \quad (17)$$

In equation (17), $s_{k,m}$ represents the SAR phase history with a fast time index k and a slow time index m. Also, z represents the complex scatterer amplitude, $f_c$ represents the center frequency of the transmitted signals, $\gamma$ represents the chirp rise rate, $\Delta T$ represents the fast time sampling period, and T represents the slow time sampling period. In addition, $\alpha_n$, $\beta_n$ and $\delta_n$ represent unknown range, radial velocity and acceleration of the selected scatterer during the nth dwell. As indicated above, and explained below, the measurement unit 58 is capable of estimating $\alpha_n$, $\beta_n$ and $\delta_n$.

Before explaining operation of the measurement unit, consider that, in addition to the SAR phase history $s_{k,m}$, the total radar return, $\hat{s}_{k,m}$, also includes ground clutter, $c_{k,m}$, and thermal noise, $v_{k,m}$. The total radar return, then, can be expressed as follows:

$$\hat{s}_{k,m} = s_{k,m} + c_{k,m} + v_{k,m} \quad (18)$$

To estimate the unknown range, radial velocity and acceleration, the measurement unit 58 can effectively apply a least squares estimation technique to the total radar return, $\hat{s}_{k,m}$. And as will be appreciated, the least squares estimation technique can coincide with applying a maximum likelihood estimation (MLE) technique in instances where the ground clutter is uniform. Written notationally, the MLE technique can be applied to estimate the range, $\alpha_n$, radial velocity, $\beta_n$, and acceleration $\delta_n$, as follows:

$$\underset{\alpha,\beta,\delta}{\mathrm{Max}}\left\{\left|\sum_{k,m}\hat{s}_{k,m}\exp\left(-j\frac{4\pi}{c}(f_c + k\Delta T\gamma)\left(\alpha + mT\beta + \frac{1}{2}m^2T^2\delta\right)\right)\right|\right\} \quad (19)$$

The expression in equation (19) is a three-dimensional search that, in accordance with embodiments of the present invention, can be accomplished in the measurement unit by performing a coarse search for $\alpha_n$, $\beta_n$, and $\delta_n$, which can be followed by a fine search for the same unknowns. In this regard, the coarse search can be implemented in accordance with a linear range migration correction technique, based on the Keystone technique, followed by quadratic phase compensation, as explained below. For a further explanation of such a technique, however, see R. P. Perry et al., *SAR Imaging of Moving Targets*, IEEE TRANSACTIONS OF AEROSPACE SYSTEMS (1999), the contents of which are hereby incorporated by reference in its entirety. Irrespective of exactly how the coarse search is implemented, thereafter the fine search can be conducted, such as in accordance with Newton's method for finding the zeros of a function of several variables, as explained below.

Briefly, the measurement unit 58 can perform the coarse search for $\alpha_n$, $\beta_n$, and $\delta_n$, based upon with a Keystone technique applied to the total radar return, $\hat{s}_{k,m}$. Such an approach can be considered the equivalent to processing the total radar return by determining, for each fast frequency sample, the Fourier transform of the total radar return in slow time. Then, an interpolation can be applied to the Fourier transform to align the slow frequency samples to the same common target radial velocity. Then, a Fourier transform can be applied with respect to the fast frequency to compress any moving targets/point scatterers that may be in the data. By performing such a coarse search, the measurement unit is capable of estimating the range and linear range migration of the target with reasonable precision.

Although the coarse search provides a reasonable estimate of the range and linear range migration, residual second and higher order terms with respect to slow time can further be estimated by the measurement unit by performing a fine search. For example, the residual second and higher order terms can be estimated in accordance with Newton's method for finding the zeros of a function of several variables. As explained below, such a method can begin with the target estimates from the coarse search. And presuming the estimates converge, the Newton technique can produce an optimally accurate estimate of range, radial velocity and acceleration.

Reference is now made to FIG. 5, which illustrates various steps in estimating the range and linear range migration of a moving target, as such may be performed by the measurement unit 58 in accordance with one embodiment of the present invention. As shown in block 68, the method of estimating the range and linear range migration can include Keystone processing of the total radar return, $\hat{s}_{k,m}$. In this regard, for each fast time variable, k, the Fourier transform of the total radar return can be computed as follows:

$$\hat{S}_{k,p} = \sum_m \hat{s}_{k,m} \exp\left(-j2\pi m \frac{p}{2M}\right) \tag{20}$$

where p represents discrete frequency values, and M represents half of the slow time samples. For a fixed target radial velocity, v, the Doppler frequency of the fixed target can be normalized by the sampling rate as follows:

$$\frac{p}{2M} = \frac{2vT}{c}(f_c + k\Delta T\gamma) \tag{21}$$

In equation (21), as before, T represents the slow time sampling period, c represents the speed of light, $f_c$ represents the center frequency of the transmitted signals, $\gamma$ represents the chirp rise rate, $\Delta T$ represents the fast time sampling period, and T represents the slow time sampling period.

To obtain full coherence while taking the Fourier transform with respect to the fast time variable k, the discrete frequency value, p, can be selected for each k as follows:

$$p = \text{round}\left(2M\frac{2vT}{c}(f_c + k\Delta T\gamma)\right) \tag{22}$$

The selection of p, as shown, depends upon the radial velocity, v. The radial velocity, v, in turn, can be quantized as:

$$\dot{v} = \frac{p'}{2M}\frac{1}{T}\frac{c}{2(f_c + K\Delta T\gamma)} \tag{23}$$

In the preceding equation (23), p' represents a discrete frequency value extending from −M to M (i.e., p' = −M, ..., M).

Next, the Fourier transform of the total radar return, $\hat{S}_{k,p}$, can be interpolated for fixed k and along p by selecting, for each p', the discrete frequency value, p(k,p'), as follows:

$$p(k, p') = \text{round}\left(p'\frac{(f_c + k\Delta T\gamma)}{(f_c + K\Delta T\gamma)}\right) \tag{24}$$

where K represents half of the fast time samples. The Fourier transform of the radial velocity compressed phase history, $\hat{S}_{k,p(k,p')}$, can then be computed as follows:

$$\hat{S}_{q,p'} = \sum_k \hat{S}_{k,p(k,p')} \exp\left(-j2\pi k\frac{q}{2K}\right) \tag{25}$$

where q represents the range cell of the target location, and can extend from −K to K (i.e., q = −K, ..., K).

Over varying p' and q, $\hat{S}_{q,p'}$ constitutes an image in range and radial velocity and a point scatterer will appear nearly as a strong peak in the image. Thus, as shown in block 70, the point scatter can be easily detected by finding the maximum of $\hat{S}_{q,p'}$ as follows:

$$\underset{q,p'}{\text{Max}}\,|\hat{S}_{q,p'}| \Rightarrow \hat{q}, \hat{p}' \tag{26}$$

Then, if the point scatterer appears at (q,p'), the range, $\hat{\alpha}_0$, and radial velocity, $\hat{\beta}_0$, can be determined as follows:

$$\hat{\alpha}_0 = \frac{c}{2\Delta T\gamma}\frac{\hat{q}}{2K} \tag{27}$$

$$\hat{\beta}_0 = \frac{\hat{p}'}{2M}\frac{1}{T}\frac{c}{2(f_c + K\Delta T\gamma)} \tag{28}$$

As indicated above, by performing such a coarse search, the measurement unit 58 is capable of estimating the range, $\hat{\alpha}_0$, and linear range migration (i.e., radial velocity, $\hat{\beta}_0$) of the target with reasonable precision. To further estimate the residual second and higher order terms with respect to slow time, then, the measurement unit can further perform a fine search, as shown in block 72. As shown, for example, the residual second and higher order terms can be estimated in accordance with Newton's method for finding the zeros of a function of several variables. Starting with the target estimates from the coarse search $(\hat{\alpha}_0, \hat{\beta}_0)$ and setting an initial estimate of the acceleration $\hat{\delta}_0$ to zero, the range, radial velocity and acceleration $(\hat{\alpha}, \hat{\beta}, \hat{\delta})$ can be determined by finding the maximum of the following:

$$A(\alpha, \beta, \delta) = \left|\sum_{k,m} \hat{s}_{k,m} \exp\left(-j\frac{4\pi}{c}(f_c + k\Delta T\gamma)\left(\alpha + mT\beta + \frac{1}{2}m^2T^2\delta\right)\right)\right| \tag{29}$$

where $A(\alpha,\beta,\delta)$ represents the reduced log-likelihood function for $\hat{s}_{k,m}$. More particularly, as will be appreciated, the range, radial velocity and acceleration $(\hat{\alpha},\hat{\beta},\hat{\delta})$ can be determined by finding the limit of recurrence in accordance with the following:

$$\begin{pmatrix} \alpha_{l+1} \\ \beta_{l+1} \\ \delta_{l+1} \end{pmatrix} = \begin{pmatrix} \alpha_l \\ \beta_l \\ \delta_l \end{pmatrix} - \begin{bmatrix} \frac{\partial^2 A}{\partial^2 \alpha} & \frac{\partial^2 A}{\partial \alpha \partial \beta} & \frac{\partial^2 A}{\partial \alpha \partial \beta} \\ \frac{\partial^2 A}{\partial \alpha \partial \beta} & \frac{\partial^2 A}{\partial^2 \beta} & \frac{\partial^2 A}{\partial \beta \partial \delta} \\ \frac{\partial^2 A}{\partial \alpha \partial \delta} & \frac{\partial^2 A}{\partial \beta \partial \delta} & \frac{\partial^2 A}{\partial^2 \delta} \end{bmatrix}^{-1} \begin{pmatrix} \frac{\partial A}{\partial \alpha} \\ \frac{\partial A}{\partial \beta} \\ \frac{\partial A}{\partial \delta} \end{pmatrix} \begin{pmatrix} \alpha = \alpha_l \\ \beta = \beta_l \\ \delta = \delta_l \end{pmatrix} \quad (30)$$

It should be noted that it is typically not possible to obtain the target motion description on the ground from a single estimate of $\hat{\alpha}$, $\hat{\beta}$ and $\hat{\delta}$. Rather, several such measurements are typically combined in a canonical fashion to obtain the desired description. The measurements can be combined in any of a number of different manners. For example, as will be appreciated, $\alpha$, $\beta$ and $\delta$ can be rewritten in terms of coordinates $(x_0, y_0), (x_0', y_0'), (x_0'', y_0'')$ of the moving target. Then, from equations (14), (15) and (16), a measurement equation for the complex scatterer amplitude can be determined as follows:

$$\vec{z}_n = \begin{bmatrix} \alpha_n \\ \beta_n \\ \delta_n \end{bmatrix} = \begin{bmatrix} A_x(n) & 0 & 0 & A_y(n) & 0 & 0 \\ B_x(n) & A_x(n) & 0 & B_y(n) & A_y(n) & 0 \\ C_x(n) & 2B_x(n) & A_x(n) & C_y(n) & 2B_y(n) & A_y(n) \end{bmatrix} \begin{bmatrix} x(t_n) \\ x'(t_n) \\ x''(t_n) \\ y(t_n) \\ y'(t_n) \\ y''(t_n) \end{bmatrix} \quad (31)$$

In accordance with embodiments of the present invention, then, the tracker unit 60 is capable of recursively estimating the ground target position, $\vec{s}_n$, at each time instance $t_n$, where:

$$\vec{s}_n = \begin{bmatrix} x(t_n) \\ x'(t_n) \\ x''(t_n) \\ y(t_n) \\ y'(t_n) \\ y''(t_n) \end{bmatrix} \quad (32)$$

As indicated above, the tracker unit 60 can receive the range, velocity and acceleration estimate, and thereafter provide updated data representative of the moving target motion description. In this regard, reference is now made to FIG. 6, which illustrates various steps in updating data representative of the position, radial velocity and acceleration of the moving target 64, as such may be performed by the tracker unit in accordance with one embodiment of the present invention. As shown, the tracker unit is capable of receiving the three-dimensional vector of range, radial velocity and acceleration $(\hat{\alpha}, \hat{\beta}, \hat{\delta})$ of the target. Within the tracker unit, then, a linear dynamic motion model for the target can be formulated and incorporated into a Kalman filter (KF), which uses the measurements $(\hat{\alpha}, \hat{\beta}, \hat{\delta})$ in a measurement model. In this regard, the Kalman filter equations can be expressed as:

$$\vec{s}_{n+1} = \Phi \vec{s}_n + \Gamma \vec{w}_n \quad (33)$$

$$\vec{z}_n = D_n \vec{s}_n + \vec{u}_n \quad (34)$$

In the preceding equation (33), $\Phi$ represents a state space transition matrix from time n to time n+1, and can be represented as follows:

$$\Phi = \begin{bmatrix} 1 & \Delta t & (\varepsilon \Delta t - 1 + e^{-\varepsilon \Delta t})/\varepsilon^2 \\ 0 & 1 & (1 - e^{-\varepsilon \Delta t})/\varepsilon \\ 0 & 0 & e^{-\varepsilon t} \end{bmatrix} \quad (35)$$

where $1/\varepsilon$ represents the decorrelation time constant of the target acceleration, and $\Delta t$ represents the time difference between consecutive dwells.

Also in equation (33), $\Gamma \vec{w}_n$, which is the plant noise term perturbing the dynamic equations, can be used to model the uncertainty in the acceleration of the target, and represents a random acceleration rate. In this regard, uncertainty in the acceleration of the target can be modeled by considering the Cholesky decomposition of the plant noise covariance, $R_\Gamma$:

$$R_\Gamma = \Gamma \Gamma^* \quad (35)$$

The plant noise covariance can therefore be obtained as:

$$R_\Gamma = \begin{bmatrix} \sigma_x^2 R_{\Gamma_1} & 0 \\ 0 & \sigma_y^2 R_{\Gamma_1} \end{bmatrix} = \sigma_x^2 R_{\Gamma_1} = \{q_{mp}\}_{m,p=1}^3 \quad (36)$$

In equation (36), $\sigma_x^2$ and $\sigma_y^2$ represent the variance of acceleration along the x and y coordinates, respectively; and $q_{mp}$ can be shown to equal the following for m,p=1, 2 and 3:

$$q_{11} = \frac{\sigma_x^2}{\varepsilon^4}\left[1 - e^{-2\varepsilon \Delta T} + 2\varepsilon \Delta T + \frac{2\varepsilon^3 \Delta T^3}{3} - 2\varepsilon^2 \Delta T^2 - 4\varepsilon T e^{-\varepsilon \Delta T}\right] \quad (37)$$

$$q_{12} = \frac{\sigma_x^2}{\varepsilon^3}[1 + e^{-2\varepsilon T} - 2\varepsilon T + 2\varepsilon T e^{-\varepsilon \Delta T} + \varepsilon^2 \Delta T^2 - 2e^{-\varepsilon \Delta T}] = q_{21} \quad (38)$$

$$q_{13} = \frac{\sigma_x^2}{\varepsilon^2}[1 - e^{-2\varepsilon \Delta T} - 2\varepsilon T e^{-\varepsilon \Delta T}] = q_{31} \quad (39)$$

$$q_{22} = \frac{\sigma_x^2}{\varepsilon^2}[4e^{-\varepsilon \Delta T} - 3 - e^{-2\varepsilon \Delta T} + 2\varepsilon T] \quad (40)$$

$$q_{23} = \frac{\sigma_x^2}{\varepsilon}[1 + e^{-2\varepsilon \Delta T} - 2e^{-\varepsilon \Delta T}] = q_{32} \quad (41)$$

Back to equation (34), $D_n$ represents a structure matrix and can be defined from equation (31) above to connect the nth measurement of the complex scatterer amplitude, $\vec{z}_n$, with the nth state space vector, $\vec{s}_n$. In this regard, $D_n$ can be represented as:

$$D_n = \begin{bmatrix} A_x(n) & 0 & 0 & A_y(n) & 0 & 0 \\ B_x(n) & A_x(n) & 0 & B_y(n) & A_y(n) & 0 \\ C_x(n) & 2B_x(n) & A_x(n) & C_y(n) & 2B_y(n) & A_y(n) \end{bmatrix} \quad (42)$$

Also in equation (34), $\vec{u}_n$ represents the noise in the measurement vector. In applying the Kalman filter, as shown in block 74 of FIG. 6, the tracker unit 60 can be initialized to determine an initial state using the first three complex scatterer amplitude measurements, $\vec{z}_n$, under the assumption that the target 64 is undergoing constant acceleration, δ, during this time. In this regard, the measurements can be expressed in terms of the initial state as follows:

$$\vec{z}_0 = D_0 \vec{s}(0,0) + \vec{u}_0 \quad (43)$$

$$\vec{z}_1 = D_1 \vec{s}(1,1) + \vec{u}_1 \quad (44)$$

$$\vec{z}_2 = D_2 \vec{s}(2,2) + \vec{u}_2 \quad (45)$$

where $\vec{s}(i,i)$ represents the filtered state space vector at time i, given the measurements through time i. Then, from equation (33), equations (44) and (45) can be rewritten as:

$$\vec{z}_1 = D_1 \Phi \vec{s}(0,0) + D_1 \Gamma \vec{w}_0 + \vec{u}_1 \quad (46)$$

$$\vec{z}_2 = D_2 \Phi^2 \vec{s}(0,0) + D_2(\chi \Gamma \vec{w}_0 + \Gamma \vec{w}_1) + \vec{u}_2 \quad (47)$$

Also during initialization, the tracker unit 60 can determine the likelihood Λ for measurements under Gaussian statistics. In this regard, the tracker unit can determine Λ as follows:

$$\Lambda = \sum_{n=0}^{2} (\vec{z}_n - D_n \Phi^n \vec{s}(0,0))^T \tilde{R}(n)^{-1} (\vec{z}_n - D_n \Phi^n \vec{s}(0,0)) \quad (48)$$

In equation (41), $\tilde{R}(n)$ represents the covariance of the nth measurement, where for n=0, 1 and 2, $\tilde{R}(n)$ can be expressed as follows:

$$\tilde{R}(0) = R_u(0) \quad (49)$$

$$\tilde{R}(1) = R_u(1) + D_1 R_{\Gamma_w} D_1^T \quad (50)$$

$$\tilde{R}(2) = R_u(2) + D_2 R_{\Gamma_w} D_2^T + D_2 \Phi R_{\Gamma_w} \Phi^T D_2^T \quad (51)$$

And in equations (49), (50) and (51) $R_{\Gamma_w}$ represents the plant noise covariance matrix, as explained above. Also, $R_u(n)$ represents the covariance of the nth measurement, which can be shown as:

$$R_u(n) = \quad (52)$$

$$\frac{1}{SNR_n} \begin{bmatrix} \frac{1}{128\pi^2} \frac{\lambda_1^2}{\lambda^2}(4\lambda_{RMS}^2 + 9\lambda^2) & 0 & -\frac{15}{32\pi^2} \frac{\lambda_1^2}{T^2} \\ 0 & \frac{3}{8\pi^2} \frac{\lambda_1^2}{T^2} & 0 \\ -\frac{15}{32\pi^2} \frac{\lambda_1^2}{T^2} & 0 & \frac{45}{8\pi^2} \frac{\lambda_1^2}{T^4} \end{bmatrix}$$

where SNR represents the range compressed and Doppler integrated signal/noise ration at the point scatterer, $\lambda_{RF}$ represents the wavelength at the RF center frequency, BW represents the radar bandwidth, and T represents the dwell duration. Also, $\lambda_{RMS}$ and $\lambda_1$ represent the wavelength corresponding to the root mean square error bandwidth, and the wavelength modified by the root mean square wavelength, and can be shown as:

$$\lambda_{RMS} = \frac{c}{BW/\sqrt{12}} \quad (53)$$

$$\lambda_1 = \frac{\lambda_{RF} \lambda_{RMS}}{\sqrt{\lambda_{RF}^2 + \lambda_{RMS}^2}} \quad (54)$$

The covariance of the nth measurement, $R_u(n)$, shown in equation (52), which is the Cramer Rao lower bound for this problem, assumes that the clutter return is uniform. For more information on such as result, see Abatzoglou et al., *Range, Radial Velocity and Acceleration MLE using Radar LFM Pulse Train*, IEEE TRANSACTIONS OF AEROSPACE SYSTEMS (1998).

After determining the likelihood Λ for measurements under Gaussian statistics, the likelihood function Λ Λ can be minimized to determine an estimate of the initial state $\vec{s}(0,0)$ as follows:

$$\vec{s}(0,0) = \left( \sum_{n=0}^{2} (\Phi^T)^n D_n^T \tilde{R}(n)^{-1} D_n \Phi^n \right)^{-1} \sum_{n=0}^{2} (\Phi^T)^n D_n^T \tilde{R}(n)^{-1} \vec{z}_n \quad (55)$$

From the initial state estimate, the covariance P(0,0) can be identified as:

$$P(0,0) = \left( \sum_{n=0}^{2} (\Phi^T)^n D_n^T \tilde{R}(n)^{-1} D_n \Phi^n \right)^{-1} \quad (56)$$

As shown in block 76 of FIG. 6, once the tracker unit 60 has been initialized to determine an estimate of the initial state, $\vec{s}(0,0)$, and corresponding covariance, P(0,0), the covariance propagation can be determined, as follows:

$$P(n+1,n) = \Phi P(n,n) \Phi^T + R_{\Gamma_w} \quad (57)$$

In equation (47), P(n,n) represents the state space vector covariance matrix at time n, and P(n+1,n) represents the predicted state space vector covariance matrix at time n+1, both given measurements through time n. Then, as shown in block 78, the gain of the Kalman filter can be determined as follows:

$$K(n+1)=P(n+1,n)D_{n+1}^T[D_{n+1}P(n+1,n)D_{n+1}^T+R_u(n+1)]^{-1} \quad (58)$$

The gain can then be used to update the state space vector and covariance. As shown in block 80, the tracker unit 60 can update the covariance (i.e., the state space covariance of the 6×6 matrix) as follows:

$$P(n+1,n+1)=[I-K(n+1)D_{n+1}]P(n+1,n) \quad (59)$$

As shown, the covariance update can then be subsequently used to determine the covariance propagation for subsequent measurements.

The tracker unit 60 can also update the state space vector by first performing an innovation measurement to measure the unpredictability of the state space vector measurements, as shown in block 82. In this regard, the tracker unit can determine the innovations, v, at time n+1 as:

$$v(n+1)=\vec{z}_{n+1}-D_{n+1}\Phi\vec{s}(n,n) \quad (60)$$

Then, as shown in block 84, the tracker unit can perform a state prediction from time n to time n+1. More particularly, the tracker unit can perform a state prediction to determine an update of the target 64 state space vector, $\vec{s}(n+1,n+1)$ as follows:

$$\vec{s}(n+1,n+1)=\Phi\vec{s}(n,n)+K(n+1)v(n+1) \quad (61)$$

The state space vector update, or updated data representative of the position and motion of the moving target, can then be provided to the moving target imaging unit 62 (see FIG. 2), which can be capable of obtaining data representative of a SAR image of the moving target as if the moving target were stationary. In addition, as shown, the state space vector update can be performing the innovation measurement for subsequent measurements.

The methods of embodiments of the present invention are generally implemented by one or more computer processing elements, such as microprocessors or the like. For example, all or a portion of the methods can be performed by the signal processor 40 in general, and the elements shown in FIG. 3 in particular, including the measurement unit 58 and tracker unit 60. The signal processor or one or more elements of the signal processor, in turn, may be comprised of one or more computer processing elements, such as microprocessors or the like. The computer processing elements typically operate under the control of a computer program product. The computer program product includes a computer-readable storage medium, such as a non-volatile storage medium, and computer-readable program code portions, such as a series of computer instructions, embodied in the computer-readable storage medium. Typically, the computer program product is stored by the computer processing element or a related memory device.

Therefore, FIGS. 5 and 6 are block diagrams and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A synthetic aperture radar (SAR) system having a single phase center antenna, the system comprising:
    a measurement unit configured for receiving a phase history of a target point scatterer, wherein the measurement unit is configured for estimating a ground position, velocity and acceleration of the target based upon the phase history to thereby detect the target; and
    a tracker unit configured for updating the ground position, velocity and acceleration of the target to thereby track the target based upon the estimated ground position, velocity and acceleration, the tracker unit being configured for updating the ground position, velocity and acceleration using a Kalman filter.

2. A SAR system according to claim 1, wherein the measurement unit is configured for estimating the ground position, velocity and acceleration in accordance with a least squares estimation technique.

3. A SAR system according to claim 2, wherein the measurement unit is configured for receiving a total radar return comprising the phase history and ground clutter, and wherein the measurement unit is configured for estimating the ground position, velocity and acceleration in accordance with a maximum likelihood estimation (MLE) technique when the ground clutter is uniform.

4. A SAR system according to claim 3, wherein the measurement unit is configured for performing a coarse search, and thereafter performing a fine search, to estimate the ground position, velocity and acceleration.

5. A SAR system according to claim 4, wherein the measurement unit is configured for performing the coarse search in accordance with a Keystone technique, and performing the fine search in accordance with Newton's method for finding the zero of a function of a plurality of variables.

6. A SAR system according to claim 1 further comprising:
a moving target imaging unit configured for obtaining data representative of a SAR image of the moving target based upon the updated ground position, velocity and acceleration of the target.

7. A SAR system according to claim 6, wherein the moving target imaging unit is configured for motion compensating to the phase history of the target point scatterer, polar formatting the motion compensated phase history, and thereafter two-dimensional Fourier transforming the polar-formatted motion compensated phase history to thereby obtain the data representative of the SAR image.

8. A synthetic aperture radar (SAR) system comprising:
a processing element configured for receiving a phase history of a target point scatterer, and thereafter estimating a ground position, velocity and acceleration of the target based upon the phase history to thereby detect the target, wherein the processing element is also configured for updating the ground position, velocity and acceleration of the target to thereby track the target based upon the estimated ground position, velocity and acceleration, the processing element being configured for updating the ground position, velocity and acceleration using a Kalman filter; and
a single-phase center antenna configured for providing a signal from which the phase history received by the processing element is determined.

9. A SAR system according to claim 8, wherein the processing element is configured for estimating the ground position, velocity and acceleration in accordance with a least squares estimation technique.

10. A SAR system according to claim 9, wherein the processing element is configured for receiving a total radar return comprising the phase history and ground clutter, and wherein the processing element is configured for estimating the ground position, velocity and acceleration in accordance with a maximum likelihood estimation (MLE) technique when the ground clutter is uniform.

11. A SAR system according to claim 10, wherein the processing element is configured for performing a coarse search, and thereafter performing a fine search, to estimate the ground position, velocity and acceleration.

12. A SAR system according to claim 11, wherein the processing element is configured for performing the coarse search in accordance with a Keystone technique, and performing the fine search in accordance with Newton's method for finding the zero of a function of a plurality of variables.

13. A SAR system according to claim 8, wherein the processing element is further configured for obtaining data representative of a SAR image of the moving target based upon the updated ground position, velocity and acceleration of the target.

14. A SAR system according to claim 13, wherein the processing element is configured for obtaining data representative of the SAR image by motion compensating to the phase history of the target point scatterer, polar formatting the motion compensated phase history, and thereafter two-dimensional Fourier transforming the polar-formatted motion compensated phase history.

15. A method comprising:
receiving a phase history of a target point scafferer, the phase history received from a synthetic aperture radar (SAR) system having a single phase center antenna;
estimating a ground position, velocity and acceleration of the target based upon the phase history, to thereby detect the target; and
updating the ground position, velocity and acceleration of the target to thereby track the target based upon the estimated ground position, velocity and acceleration, the ground position, velocity and acceleration being updated using a Kalman filter.

16. A method according to claim 15, wherein estimating a ground position, velocity and acceleration of the target comprises estimating a ground position, velocity and acceleration in accordance with a least squares estimation technique.

17. A method according to claim 16, wherein receiving a phase history comprises receiving a total radar return comprising the phase history and ground clutter, and
wherein estimating a ground position, velocity and acceleration in accordance with a least squares estimation technique comprises estimating a ground position, velocity and acceleration in accordance with a maximum likelihood estimation (MLE) technique when the ground clutter is uniform.

18. A method according to claim 17, wherein estimating a ground position, velocity and acceleration in accordance with a MLE technique comprises performing a coarse search, and thereafter performing a fine search, to estimate the ground position, velocity and acceleration.

19. A method according to claim 18, wherein performing a coarse search comprises performing a coarse search in accordance with a Keystone technique, and
wherein performing a fine search comprises performing a fine search in accordance with Newton's method for finding the zero of a function of a plurality of variables.

20. A method according to claim 15 further comprising:
obtaining data representative of a SAR image of the moving target based upon the updated ground position, velocity and acceleration of the target.

21. A method according to claim 20, wherein obtaining data representative of a SAR image comprises:
motion compensating to the phase history of the target point scatterer;
polar formatting the motion compensated phase history; and
two-dimensional Fourier transforming the polar-formatted motion compensated phase history to thereby obtain the data representative of the SAR image.

22. A computer program product comprising at least one computer-readable storage medium having computer-readable program portions stored therein, the computer-readable program portions comprising:
a first executable portion for receiving a phase history of a target point scatterer, the first executable portion being adapted to receive the phase history from a synthetic aperture radar (SAR) system having a single phase center antenna;
a second executable portion for estimating a ground position, velocity and acceleration of the target based upon the phase history to thereby detect the target; and
a third executable portion for updating the ground position, velocity and acceleration of the target to thereby track the target based upon the estimated ground position, velocity and acceleration, the third executable portion being adapted to update the ground position, velocity and acceleration using a Kalman filter.

23. A computer program product according to claim 22, wherein the second executable portion is adapted to estimate the ground position, velocity and acceleration in accordance with a least squares estimation technique.

24. A computer program product according to claim 23, wherein the first executable portion is adapted to receive a total radar return comprising the phase history and ground clutter, and
wherein the second executable portion is adapted to estimate the ground position, velocity and acceleration in accordance with a maximum likelihood estimation (MLE) technique when the ground clutter is uniform.

25. A computer program product according to claim 24, wherein the second executable portion is adapted to perform a coarse search, and thereafter performing a fine search, to estimate the ground position, velocity and acceleration.

26. A computer program product according to claim 25, wherein the second executable portion is adapted to perform the coarse search in accordance with a Keystone technique, and perform the fine search in accordance with Newton's method for finding the zero of a function of a plurality of variables.

27. A computer program product according to claim 22 further comprising:
a fourth executable portion for obtaining data representative of a SAR image of the moving target based upon the updated ground position, velocity and acceleration of the target.

28. A computer program product according to claim 27, wherein the fourth executable portion is adapted to motion compensate to the phase history of the target point scatterer, polar format the motion compensated phase history, and thereafter two-dimensional Fourier transform the polar-formatted motion compensated phase history to thereby obtain the data representative of the SAR image.

* * * * *